(12) United States Patent
Löbbert et al.

(10) Patent No.: US 10,976,291 B2
(45) Date of Patent: Apr. 13, 2021

(54) SENSOR FOR DETERMINING A MEASURAND DEPENDENT UPON A CONCENTRATION OF REACTIVE OXYGEN SPECIES

(71) Applicant: Endress+Hauser Conducta GmbH+Co. KG, Gerlingen (DE)

(72) Inventors: Andreas Löbbert, Waldheim (DE); Katrin Scholz, Bobritzsch (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 491 days.

(21) Appl. No.: 15/834,120

(22) Filed: Dec. 7, 2017

(65) Prior Publication Data

US 2018/0156765 A1 Jun. 7, 2018

(30) Foreign Application Priority Data

Dec. 7, 2016 (DE) .................. 10 2016 123 700.0

(51) Int. Cl.
*G02F 1/1503* (2019.01)
*G02F 1/1514* (2019.01)
(Continued)

(52) U.S. Cl.
CPC ......... *G01N 31/228* (2013.01); *G01N 21/645* (2013.01); *G01N 21/6408* (2013.01);
(Continued)

(58) Field of Classification Search
None
See application file for complete search history.

(56) References Cited

U.S. PATENT DOCUMENTS

| 5,393,399 | A | * | 2/1995 | Van den Berg | .... | G01N 27/4045 |
| | | | | | | 204/409 |
| 2012/0036921 | A1 | * | 2/2012 | De Coulon | ........ | G01N 27/4045 |
| | | | | | | 73/61.61 |

(Continued)

FOREIGN PATENT DOCUMENTS

| CN | 101209201 A | 7/2008 |
| CN | 102395879 A | 3/2012 |

(Continued)

OTHER PUBLICATIONS

Reversible, fluorescence-based optical sensor for hydrogen peroxide, Mills et al., The Analys, Issue 6 2007, pp. 566-571 (Year: 2007).*

(Continued)

*Primary Examiner* — Neil N Turk
(74) *Attorney, Agent, or Firm* — Christopher R. Powers; Endress+Hauser (USA) Holding Inc.

(57) ABSTRACT

The present application discloses a sensor for determining a measurand correlated with a concentration of at least one analyte belonging to the class of reactive oxygen species in a measuring fluid, the sensor including a sensor element having an indicator substance, wherein the indicator substance is oxidized into an oxidized form of the indicator substance by the at least one analyte, a means for generating a flow of current in the sensor element that causes a reduction of the oxidized form of the indicator substance and thereby regeneration of the indicator substance, an optical measuring sensor to detect measuring radiation influenced by the oxidized form of the indicator substance and to generate an electrical measuring signal using the influenced measuring radiation, and a sensor switch connected to the optical measuring sensor to receive the measuring signal and (Continued)

to ascertain a measured value of the measurand using the measuring signal.

24 Claims, 6 Drawing Sheets

(51) Int. Cl.
  *G01N 27/403* (2006.01)
  *G01N 31/22* (2006.01)
  *G01N 21/64* (2006.01)
  *G01N 21/77* (2006.01)
  *G01N 21/78* (2006.01)
  *G01N 21/15* (2006.01)
  *G01N 21/75* (2006.01)

(52) U.S. Cl.
  CPC ......... *G01N 21/7703* (2013.01); *G01N 21/78* (2013.01); *G01N 31/225* (2013.01); *G02F 1/1503* (2019.01); *G02F 1/1514* (2019.01); *G01N 21/15* (2013.01); *G01N 2021/6434* (2013.01); *G01N 2021/6484* (2013.01); *G01N 2021/758* (2013.01); *G01N 2021/772* (2013.01); *G01N 2021/7786* (2013.01)

(56) References Cited

U.S. PATENT DOCUMENTS

2014/0021068 A1\* 1/2014 Arimoto .............. G01N 27/406
  205/783.5
2015/0027887 A1\* 1/2015 Lee .................... G01N 27/3335
  204/406

FOREIGN PATENT DOCUMENTS

CN 103257174 A 8/2013
CN 103674939 A 3/2014

OTHER PUBLICATIONS

Reversible Optical Sensor Membrane for Hydrogen Peroxide Using an Immobilized Fluorescent Probe and its Application to a Glucose Biosensor, Wolfbeis et al., Microchimica Acta 143, 221-227, 2003 (Year: 2003).\*

Spectroscopic detection of Hydrogen peroxide with an optical fiber probe using chemically depsoited Prussian blue, Khorami et al., Electrochimica Acta, vol. 115, Jan. 1, 2014, pp. 416-424 (Year: 2014).\*

\* cited by examiner

SENSOR FOR DETERMINING A MEASURAND DEPENDENT UPON A CONCENTRATION OF REACTIVE OXYGEN SPECIES

CROSS-REFERENCE TO RELATED APPLICATION

The present application is related to and claims the priority benefit of German Patent Application No. 10 2016 123 700.0, filed on Dec. 7, 2016, the entire contents of which are incorporated herein by reference.

TECHNICAL FIELD

The present application relates to a sensor for determining a measurand which correlates with a concentration of at least one reactive oxygen species in a measuring fluid.

BACKGROUND

Reactive oxygen species (or ROS for short), which are also termed "oxygen radicals," include on the one hand radicals such as the hyperoxide anion $O_2^-$, the hydroxyl radical OH*, the peroxyl radical ROO* and the alkoxyl radical RO* of lipids, as well as stable molecular oxidants such as hydrogen peroxide $H_2O_2$, hydroperoxide ROOH, ozone $O_3$, the hypochlorite anion $OCl^-$, and also oxygen molecules in an excited state such as singlet oxygen $^1O_2$. ROS therefore comprise radicals, or unstable compounds which can form radicals in their surroundings.

Both amperometric as well as optical sensors are known for determining the concentration of one or more ROS as an analyte or analytes.

The amperometric sensors which are known in the prior art are, however, dependent upon flow on the one hand and, on the other hand, do not possess a high selectivity, i.e., non-negligible cross-sensitivities to other analytes therefore frequently occur. Precise measurements of ROS or measurands dependent thereupon are thus frequently only possible in disinfectants with basic compositions, i.e., contents, which are known, so that cross-sensitivities can be excluded or compensated for mathematically.

Optical sensors based upon fluorescence quenching for identifying hydrogen peroxide have been known for decades. One of the first sensors is known from Hermann E. Posch, Otto S. Wolfbeis, "Optical sensor for hydrogen peroxide," *Microchimica Acta*, Vol. 97, Issue 1, 41-50, 1989, and is based upon a silicone spot that comprises a permeation-selective membrane, a catalyst for converting peroxides to oxygen, and an oxygen-sensitive membrane. The surrounding oxygen concentration must be computationally factored in when calculating the peroxide concentration. A disadvantage of these sensors is the slow response time on the order of minutes, and the only relatively small available measuring range of 0.1-10 mmol/l.

Enzyme-based sensors with a high selectivity for peroxides are also known. These, however, are not very temperature stable.

A development of optical sensors for determining concentrations of ROS seeks to improve the selectivity, e.g., by using dyes with selective receptor sites. On the other hand, many of these optical ROS sensors have the disadvantage that the optical change by which the measurand is ascertained is either irreversible or can only be reversed a few times, since a chemical change in the indicator molecule occurs. For example, Christoph Staudinger and Sergey Borisov in "Long-wavelength analyte-sensitive luminescent probes and optical(bio)sensors," *Methods Appl. Fluoresc.* 3 (2015) 1-73, describe phosphorescent organic complexes that bring about an increase in the phosphorescence in the near infrared range upon oxidation with a hypohalogenite while binding a dye, wherein the initial state can be restored only by a chemical reaction. This has the disadvantage that a sensor can again display a decreasing concentration of the analyte only after being dipped in a regeneration solution that restores the initial state of the sensor through chemical regeneration. If the sensor is also to measure fluctuating progressions of concentration, it must regularly be regenerated in this manner. This method takes time and energy and is problematic in terms of measurement, since interruption-free measurement over longer periods is impossible. If such a sensor is to be used for automatically monitoring and controlling a process, exchangeable fittings are needed that make it possible to regularly and automatically remove the sensor from the process and automatically supply the sensor with a regeneration solution to restore the initial state. This is, however, involved and creates regular interruptions.

Color patches are also known for detecting ROS in dosimeters or food packages. The reactions upon which these color patches are based are also irreversible and therefore unsuitable for a sensor that is to be used over a long period in process analysis for monitoring and/or controlling or respectively regulating an industrial process.

For determining a concentration of hydrogen peroxide by measuring reflections, the reduced form of Prussian blue (also termed Berlin blue or Turnbull's reagent), as well as Prussian white (also termed Berlin white or Everitt's salt) is described as an inorganic, chemically-stable indicator substance in H. Akbari Khorami, P. Wild, N. Djilali, "Fiber optical sensors for hydrogen peroxide vapor," *International Scholarly and Scientific Research & Innovation*, 9(10), 1145, 2015. In this context, attempts have been made up to now to restore the original state by immersion in a regeneration solution containing a reduction agent. This is possible, but it necessitates mechanical immersion of the sensor in the regeneration solution and is associated with maintenance work. Moreover, the reducing effect of the regeneration solution decreases over time due to the consumption of the reduction agent, and the regeneration solution must therefore be regularly replenished. The potential entrainment of measuring solution into the regeneration solution can cause false measured values. An entrainment of regeneration solution into the measuring solution can also be problematic for the process monitored by the sensor.

SUMMARY

It is therefore the aim of the present application to present a generic sensor for measuring a measurand that correlates with a concentration of reactive oxygen species and overcomes the aforementioned disadvantages of the sensors known from the prior art.

The aim is achieved by a sensor according to claim 1. Advantageous embodiments are listed in the dependent claims.

The sensor according to the present application for determining a measurand that correlates with a concentration of at least one analyte that belongs to the class of reactive oxygen species in a measuring fluid in particular, a measuring liquid comprises:

a sensor element provided for contacting the measuring fluid that comprises an indicator substance, wherein the indicator substance is intended to be oxidized into an oxidized form of the indicator substance by the at least one analyte;

means for generating a flow of current in the sensor element that causes a reduction of the oxidized form of the indicator substance, and thereby a regeneration of the indicator substance;

an optical measuring sensor that is designed to detect measuring radiation that is influenced by the oxidized form of the indicator substance, and to generate an in particular, electrical measuring signal using the influenced measuring radiation; and a sensor circuit that is connected to the optical measuring sensor to receive the measuring signal, and that is designed to ascertain a measured value of the measurand using the measuring signal.

The measurand correlated with concentration of the analyte in the measuring fluid can be a concentration of one or more of the aforementioned reactive oxygen species, or a concentration of a substance in the measuring fluid that is converted by a chemical reaction into a reactive oxygen species and possibly other products. For example, it can be glucose that is converted by glucose oxidase into hydrogen peroxide and gluconolactone, wherein the concentration of the glucose in the measuring fluid correlates with the amount of concentration of hydrogen peroxide formed by being converted by the glucose oxidase.

For example, the influenced measuring radiation detected by the optical measuring sensor can be measuring radiation transmitted by the sensor element or reflected on or in the sensor element, whose intensity is, for example, attenuated by being absorbed by the oxidized form of the indicator substance. Alternatively, the influenced measuring radiation detected by the measuring sensor can be luminescence radiation emitted by the oxidized form of the indicator substance, or a luminescence radiation of a reference substance contained in the sensor element that is influenced by the oxidized form of the indicator substance.

The indicator substance and the oxidized form of the indicator substance can interact with the measuring radiation in different ways, so that a distinction can be drawn using the optical measuring sensor between measuring radiation influenced by the indicator substance and measuring radiation influenced by the oxidized form of the indicator substance, or the measuring sensor can be designed so that it exclusively detects the measuring radiation influenced by the oxidized form of the indicator substance and converts it into a measuring signal. For example, the intensity of the influenced measuring radiation can be a measure of the amount of the oxidized form of the indicator substance in contact with the measuring fluid. This in turn depends upon the concentration of the analyte in the measuring fluid such that the intensity of the influenced measuring radiation is a measure of the concentration of the analyte and therefore correlates directly with the measurand to be determined.

The indicator substance can, for example, change its color by being oxidized by the analyte into an oxidized form of the indicator substance, which corresponds to a change of its absorption behavior. The indicator substance can alternatively or in addition change its luminescence behavior in particular, its fluorescence or phosphorescence behavior by being oxidized, e.g., by changing a luminescence decay time, a phase angle, or its luminescence spectrum, such as the shift of a luminescence wavelength, or the change in intensity of luminescence radiation.

To generate a measuring signal, the measuring sensor can be correspondingly designed to detect an intensity and/or a phase angle shift, and/or a decay time, and/or a wavelength shift of the received measuring radiation.

The disadvantages of the amperometric sensors known from the prior art, such as dependency on flow or low selectivity with regard to the analyte, are avoided according to the present application by using an optical measuring sensor. On the other hand, according to the present application, the disadvantages of the previously known optical sensors for determining the concentration of ROS, such as the regular regeneration of the sensor with a chemical regeneration solution through regenerating by reducing the oxidized form of the indicator substance using a flow of current induced in the sensor element, are also avoided. By reducing the oxidized form of the indicator substance with a flow of current, the sensor can be very quickly restored, without additional chemicals and without long interruptions, to a state in which it can measure measured values of the measurand that correlates with a concentration of the at least one reactive oxygen species and is less than the previously detected measured value.

Advantageously, the sensor can be used to measure the concentration of hydrogen peroxide as an analyte.

The indicator substance is advantageously an inorganic or organic substance which can be oxidized into a stable oxidized form, wherein the indicator substance and its oxidized form preferably differ in terms of an optical property such that the measuring radiation is converted in a different way upon interacting with the indicator substance and the oxidized form of the indicator substance. Advantageously, the oxidized form of the indicator substance has a different color than the indicator substance. The indicator substance can, for example, be an electrochromic substance.

The indicator substance can, for example, be a reduced form of Berlin blue (also termed Prussian blue or Turnbull's reagent). The reduced form of Berlin blue is also termed Berlin white (or Prussian white or Everitt's salt). The indicator substance can also have an analog of Berlin blue with the composition $K_n M1_m [M2_o(CN)_6]_p$, wherein K is selected from the group formed from Li, Na, K, Rb, Cs, and $NH_4$, and wherein M1 and M2 are metals that are selected from the group formed from Fe, Co, Ni, Mn, Cd, Cu, Cr, V, and Ru. M1 and M2 can be the same metal such as, for example, $K_4M_4[Fe(CN)_6]_3$ in the case of Berlin blue, or $K_2Co_3[Co(CN)_6]_2$ in the case of co-analogs of Berlin blue, or different metals such as $KCr[Fe(CN)_6]$.

The indicator substance can also be an electrochromic metal oxide. Electrochromic transition metal oxide compounds such as $WO_3$, $MoO_3$, $IrO_2$, NiO, $Nb_2O_5$, $RuO_2$, and $BiVO_4$ are possible, for example. Also possible are stable compounds of Cu(I) that can be oxidized into corresponding Cu(II) compounds, as well as ferrocene and ferrocene derivatives and ruthenium complexes.

Possible organic electrochromic indicator substances are electroactive conductive polymers, methyl viologen, PANI, diquat dibromide, metal organic phthalocyanine compounds such as ytterbium bisphthalocyanine), poly(3,4-ethylenedioxy)thiophene (PEDOT), polyfluorene, polyacetylene, poly-p-phenylene vinylene, polyaniline, polypyrrole, polythiophene, or poly-p-phenylene.

Preferably, the indicator substance is thermally stable up to at least a temperature of 140° C. This is, for example, the case with inorganic indicator substances.

The aforementioned means for generating the flow of current can comprise one or more converter elements, in contact with the indicator substance, that are designed to convert mechanical, optical, thermal, or chemical energy into a voltage or current. This is advantageous when only a slight amount of energy can be provided for regenerating the indicator substance. The generation of current by the converter element can be initiated by an external pulse for example, by means of a pulse generator integrated in the sensor, or by means of an external pulse generator. In particular, the pulse generator can comprise its own energy supply, so that is not dependent upon the energy of the sensor. The pulse generator can, advantageously, be connected to the sensor circuit, or to a higher-level unit which is designed to communicate with the sensor circuit. The pulse generator can, advantageously, be controlled by the sensor circuit, or by the higher-level unit, such that the points in time at which pulses are initiated are coordinated with the detection of measured values, and are, in particular, synchronized therewith.

For example, the means for generating the flow of current can comprise a plurality of piezo crystals in contact with the indicator substance and, in particular, embedded in the sensor element. The piezo crystals can, for example, comprise zinc oxide, lithium niobate, or calamine (iron oxide/zinc oxide) in particular, in the form of nanorods. In this embodiment, a pulse generator for generating the flow of current can be a sound source or pressure emitter, such as a pneumatic system.

In another example, the means for generating the flow of current can comprise a Peltier element in contact with the indicator substance. In this embodiment, the pulse emitter for generating current by means of the Peltier element can be a heat source such as a resistance heater or a heat exchanger.

The means for generating the flow of current can comprise an electrochromic substance by means of which an external light pulse is converted into current, which serves to reduce the oxidative form of the indicator substance. For example, the sensor element in this embodiment can comprise a Gratzel cell. The pulse generator for initiating the generation of current can be a radiation source such as a light source. The sensor element can therefore comprise, for example, two electrochromic substances, wherein one of the electrochromic substances serves as the indicator substance, which is oxidized by the analyte, and the second electrochromic substance serves to convert electromagnetic radiation in particular, light into electric current, in order to instigate a flow of current through the sensor element to regenerate the indicator substance of the sensor.

The means for generating a flow of current in the sensor element can comprise at least two electrodes in particular, designed as components of the sensor element that are in contact with the indicator substance, and a voltage source that is connected or connectible to the electrodes in an electrically conductive manner for applying a voltage between the electrodes. By means of the voltage source, a voltage can be applied to the electrodes that instigates a flow of current through the sensor element to reduce the oxidized form of the indicator substance. The level of the applied voltage is such that the oxidized form of the indicator substance is reduced by a current flowing between the electrodes, thereby regenerating the indicator substance.

In this embodiment, the sensor accordingly comprises:
a sensor element provided for contacting the measuring fluid that comprises an indicator substance and at least two electrodes which are electrolytically in contact with the indicator substance, wherein the indicator substance is intended to be oxidized into an oxidized form of the indicator substance by the analyte;
a voltage source that can be connected to the electrodes, in order to apply a voltage between the electrodes;
an optical measuring sensor that is designed to detect an intensity of a measuring radiation influenced by the oxidized form of the indicator substance, and to generate a measuring signal using the influenced measuring radiation, e.g., using an intensity, phase angle, or a decay time, or a level of the measuring radiation dependent thereupon; and
a sensor circuit that is connected to the optical measuring sensor to receive the measuring signal, and that is designed to ascertain a measured value of the measurand using the measuring signal.

The sensor can comprise a function generator, connected to the voltage source, which serves to apply a pre-specified voltage between the electrodes as a function of time. For example, the function generator can pre-specify a constant DC voltage value over a pre-specified duration, or a sequence of several DC voltage pulses of a pre-specified length. The sensor circuit can be designed to control the voltage source and/or the function generator. Alternatively, the sensor circuit and/or the function generator can be connected to a higher-level data processing unit for communication, wherein the higher-level data processing unit controls the function generator and sensor circuit in particular, in order to coordinate and, in particular, synchronize the detection of measured values by the optical measuring sensor and regeneration of the sensor by a flow of current through the sensor element initiated by the voltage sensor.

The electrodes can comprise a least one metal such as copper, silver, platinum, gold, or carbon in an electrically conductive modification or a semi-conductor material such as silicon, germanium, gallium arsenide, indium tin oxide (ITO) or their salts, or a conductive polymer. Doped or non-doped, oxidized or non-oxidized conductive polymers are possible as the conductive polymer, e.g., polypyrroles, cis- or trans-polyazetylene, polyparaphenylene, polythiophene, polyparaphyenylene vinylene, polyaniline, poly(3,4-ethylenedioxythiophene:poly(styrene sulfonic acid), liquid crystalline thiophene derivatives, poly(paraphenylene sulfide), poly(heptadiyne), poly(ethylenedioxythiophene), or poly(isothianaphthene). Other polymers with conductive additives such as silver paste, CNT, SWCNT in a transparent polymer, such as TOPAS, or graphite are possible as the conductive polymer.

In one advantageous embodiment, the electrodes can be formed from a material transparent to the measuring radiation that in one embodiment covers a wavelength range of the visible spectrum range, such as indium tin oxide (ITO), fluoro-tin oxide (FTO), aluminum zinc oxide (AZO), and antinomy tin oxide (ATO).

In an advantageous embodiment, the sensor element comprises a membrane that contains the indicator substance. The indicator substance can be immobilized and possibly encapsulated in a matrix so that it cannot leave the measuring liquid, or can only leave slowly. In one advantageous embodiment, the matrix is formed from an inorganic material; however, it can also alternatively comprise a polymer.

The matrix with the indicator substance can form the membrane per se. It is also possible for the membrane to be formed from a first layer formed by the matrix with the indicator substance and from other layers. For example, at least one additional layer can be provided that is permeable to the measuring membrane and/or the analyte, and prevents or suppresses the discharge of the indicator substance into the measuring fluid. The membrane layer which is permeable to the analyte can, for example, be selectively permeable to the analyte, such as a reactive oxygen species in particular, hydrogen peroxide. The sensor element can comprise other protective or functional layers in addition to the membrane and the membrane layer permeable to the measuring fluid or the analyte.

Of the electrodes, a first one can cover at least part of a top side of the membrane, and a second one can cover at least part of the bottom side of the membrane. On its side facing away from the membrane, the electrodes can have other layers for example, to facilitate wetting by the measuring fluid.

In alternative embodiments, the electrodes can also be embedded in the membrane or contact the membrane in another way.

The first electrode can be transparent to the measuring radiation and the measuring radiation influenced by the oxidized indicator substance, and impermeable to the analyte and/or the measuring fluid. This electrode is arranged on the side of the membrane facing away from the measuring fluid and allows measuring radiation to radiate into the membrane with the indicator substance arranged between the electrodes.

The optical measuring sensor can, for example, be designed to detect the intensity of the measuring radiation transmitted by the oxidized form of the indicator substance. The measuring signal of the optical measuring sensor accordingly depends upon the absorption of the measuring radiation by the indicator substance. In this case, the optical measuring sensor can have a radiation source that emits measuring radiation, wherein the measuring radiation is directed toward the membrane. Advantageously, the measuring radiation passes through the transparent first electrode to the membrane. The measuring sensor moreover has a radiation receiver to which is directed the measuring radiation transmitted through the membrane with the indicator substance. Advantageously, the second electrode is also designed to be transparent to the measuring radiation in this embodiment, so that the measuring radiation transmitted through the membrane passes through the second electrode to the radiation receiver, wherein the transmitted measuring radiation can, if applicable, be guided to the radiation receiver by means of a light guide.

In an alternative embodiment, the optical measuring sensor can be designed to detect measuring radiation reflected or scattered by the membrane or a reflective layer of the sensor element, or luminescence radiation emitted by the oxidized indicator substance after being excited by the measuring radiation, or luminescence radiation of a reference substance influenced by the oxidized indicator substance. In this embodiment, the optical measuring sensor can comprise a radiation source radiating the measuring radiation into the membrane and a radiation receiver that is designed to output a measuring signal dependent upon the received intensity, wherein the radiation source and the radiation receiver are each arranged in a sensor housing that is closed at one end by the sensor element comprising the membrane. The measuring radiation can be conducted from the radiation source via a light guide to the membrane, and the reflected or scattered radiation or the luminescence radiation can be guided by the light guide or an additional light guide to the receiver.

The sensor can have a housing in which the optical measuring sensor and the sensor circuit are accommodated. The sensor element can close the sensor housing on one side in particular, a sensor end face intended to be immersed in the measuring fluid. A geometry of the second electrode can determine a shape and/or properties of the sensor face, e.g., such that the shape of the sensor face makes it difficult for gas bubbles or impurities to accumulate.

The second electrode covering at least one part of the bottom side of the membrane can be formed as a network structure from a conductive material in particular, a metal. In this manner, the second electrode is permeable to the measuring fluid on the one hand, and, on the other hand, the network structure can be modified, e.g., coated with a hydrophilic polymer, so that it repels bubbles and/or dirt. The network structure can also have a shape that makes difficult or prevents the accumulation of gas bubbles.

The sensor circuit can also be designed to perform amperometric measurements using the electrodes. For example, the sensor circuit can be designed to ascertain a current strength of a current flowing between the first and second electrodes at a pre-specified voltage and, using the ascertained current strength, to determine the measurand, or a further measurand different from the measurand. If this measurand is determined both by means of the optical measuring sensor of the sensor and amperometrically, the sensor circuit can also be designed to detect and evaluate deviations in the measured values ascertained by the two methods. If applicable, the sensor circuit can be designed to emit a warning in the event of a deviation that exceeds a pre-specified threshold.

In one embodiment, the sensor circuit can be designed to simulate a value of the measurand by applying a pre-specified voltage over a pre-specified period to the membrane, and to ascertain a measured value of the simulated measurand by means of the optical measuring sensor, and to perform a calibration, verification, or adjustment of the sensor using the ascertained measured value. To accomplish this, the sensor circuit can be connected to three electrodes which are in contact with the membrane and by means of which the sensor circuit can apply a controlled voltage to the membrane.

The present application also relates to a measuring device comprising the sensor according to one of the above-described embodiments and a higher-level unit connected to the sensor in particular, a measuring transducer, or control electronics, or an energy supply, wherein the sensor and the higher-level unit are coupled to each other by a galvanically isolated connection in particular, an inductive plug-in connector coupling and/or a radio connection and wherein energy is transmitted unidirectionally from the higher-level unit to the sensor by means of the galvanically isolated connection.

The higher-level unit can comprise a data processing unit. The measuring device can moreover be designed so that additional data in particular, the measurand are transmitted bi-directionally between the sensor and the higher-level data processing unit via the galvanically isolated connection.

The sensor can have a housing that comprises at least the sensor circuit, the optical measuring sensor, and the sensor element. In one possible embodiment, the sensor element can be securely connected to the housing, so that it cannot be exchanged. In this case, it is advantageous when the indicator substance and a reference substance possibly comprised by the sensor element, as well as the sensor matrix, are formed from inorganic substances so that they are chemically stable, and the sensor accordingly has a correspondingly long operating time. It is also possible for the housing to comprise an exchangeable cap that has the sensor element in particular, when the sensor element comprises components that age during the service life of the sensor in a manner that impairs the functionality of the sensor. In this case, after a certain operating time, a cap can be exchanged with a cap having a new sensor element. In another alternative embodiment, the sensor element itself can be designed to be exchangeable.

BRIEF DESCRIPTION OF THE DRAWINGS

The present application is explained in further detail below on the basis of the exemplary embodiments shown in the illustrations. The figures show.

DETAILED DESCRIPTION

Figure 1:
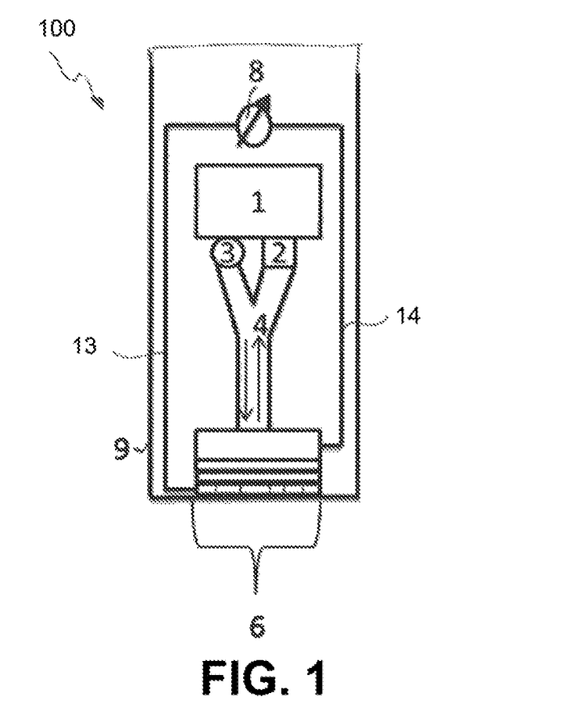
FIG. 1 shows a sensor for measuring a concentration of a reactive oxygen species according to a first exemplary embodiment.

FIG. 1 schematically portrays a sensor 100 for measuring a concentration of hydrogen peroxide in a measuring fluid, in particular, a measuring liquid such as an aqueous disinfectant solution. The sensor 100 has a cylindrical sensor housing 9 that is closed at a face by a sensor element 6. A sensor circuit 1 is accommodated in the sensor housing along with an optical measuring sensor that has a radiation receiver 2 and a radiation source 3. An LED or an arrangement of several LED's, for example, are possible as the radiation source 3. The radiation receiver 2 can comprise one or more photodiodes or CCD elements. The radiation receiver 2 is designed to convert electromagnetic radiation into an electrical signal, such as a current or voltage, the signal value of which depends upon the intensity of the electromagnetic radiation. The sensor circuit 1 is designed to control the radiation source 3 for emitting measuring radiation, and to receive signals of the radiation receiver 2 and process them as measuring signals.

The sensor 100 in the present example comprises a Y-shaped light guide 4 that on the one hand guides measuring radiation from the radiation source 3 to the sensor element 6 and, on the other hand, returns the measuring radiation converted in the sensor element 6 to the radiation receiver 2.

Moreover, the sensor 100 comprises a voltage source 8 which, in the present example, can also be controlled by the sensor circuit 1.

Figure 2:
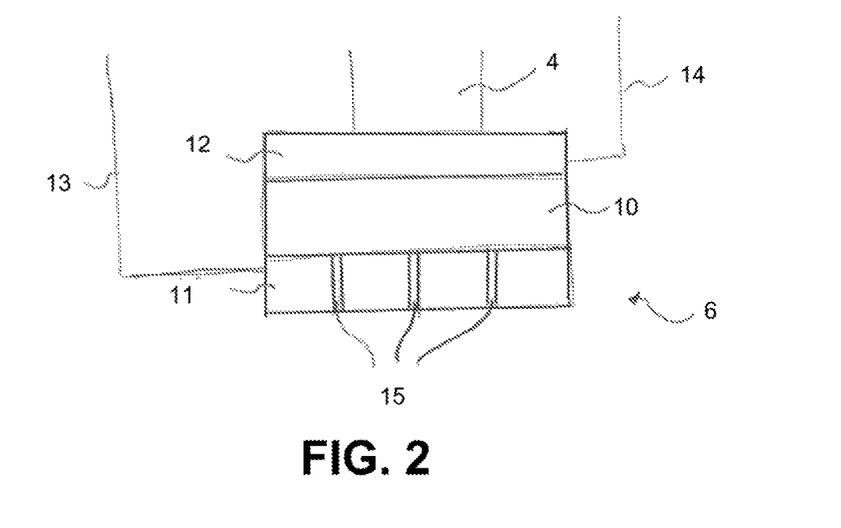
FIG. 2 shows the sensor element of the sensor portrayed in FIG. 1.

FIG. 2 portrays the sensor element 6 of the sensor 100 in greater detail. The sensor element 6 comprises a membrane 10 that comprises at least one layer which is formed from a matrix comprising an indicator substance. The matrix can, for example, be a polymer or an inorganic substance such as a salt or a porous ceramic. The indicator substance can be immobilized in the matrix, such as in pores or in gaps in the polymer structure; it can also be chemically bound to the matrix. In the present example, the matrix is formed from Nafion in which Berlin white (also termed Prussian white or Everitt's salt) is immobilized as the indicator substance. In alternative embodiments, the membrane can have additional layers that, for example, can serve as barriers to the leakage of the indicator substance from the membrane. Additional functional layers can be provided, e.g., the membrane can comprise an opaque layer that suppresses the entrance of measurement-impairing radiation from the surroundings into the interior of the housing 9.

In the present example, the sensor element 6 comprises a first electrode 11 that is arranged on the outer side of the membrane 10, i.e., facing away from the inside of the housing 9, and that at least partially covers the membrane 10. The sensor element 6 comprises a second electrode 12 that is arranged opposite the first electrode 11 on the side of the membrane 10 facing the inside of the housing 9, and at least partially covers it. The first electrode 11 is contacted by a first electrical line 13 that is connected to the voltage source 8. The second electrode 12 is contacted by a second electrical line 14 that is also connected to the voltage source 8. The voltage source 8 can accordingly apply a pre-specifiable voltage, in particular, pre-specified by the sensor circuit 1 between the electrodes 11 and 12.

In the present example, the first electrode 11 consists of transparent indium tin oxide (ITO) and has pores 15 through which measuring liquid can pass to the membrane 10. The first electrode 11 can alternatively be formed from a plurality of other materials such as a metal, carbon, a conductive polymer, or a conductive composite material. In the present example, the second electrode 12 also consists of transparent ITO, so that measuring radiation from the light guide 4 can pass through the electrode 12 into the membrane 10, or measuring radiation changed in the membrane 10 can pass through the electrode 12 back into the light guide 4 and to the radiation detector 2.

A measurement of the concentration of an analyte belonging to the class of ROS, in particular, hydrogen peroxide with the sensor 100 is based upon the following principle. The indicator substance is intended to be oxidized by the analyte hydrogen peroxide in this case into an oxidized form of the indicator substance. When Berlin white is the indicator substance, the following reaction occurs, in which color-free Berlin white is oxidized into blue Berlin blue:

The formed Berlin blue can be detected optically, e.g., by means of absorption or reflection measurement, or, as in the present example, by means of fluorescence measurement. For this, the membrane 10 comprises a reference substance that is also immobilized in the matrix. The reference substance can be an organic or inorganic dye that is basically chemically inert and, in particular, does not react with the analyte. The reference dye can also be excited by measuring radiation emitted by the radiation source 3 to a luminescence with a decay time ranging between 1 µs and 1000 µs. If Berlin blue is in the matrix in addition to the reference dye, it influences the luminescence signal received by the radiation receiver. In contrast, Berlin white does not influence the luminescence signal. Differences in concentration can be determined in this manner and detected by the radiation receiver 2, which emits to the sensor circuit 1 an electrical measuring signal representative of the hydrogen peroxide concentration in the measuring fluid. The reference dye can be immobilized in the matrix together with the indicator substance, or in another layer of the membrane.

The sensor circuit 1 is designed to ascertain a current measured value of the hydrogen peroxide concentration from the measuring signal of the radiation receiver 2 based upon an empirically ascertained assignment guideline that assigns measured values of the hydrogen peroxide concentration to measuring signals of the radiation receiver 2. The sensor circuit 1 can comprise a display or another display element by means of which it can output the ascertained measured value. It can, alternatively, also have a wired or wirelessly connectible communication interface with a higher-level data processing unit such as a computer, a measuring transducer, a portable control unit such as a smart phone or tablet computer, or a programmable logic controller, by means of which it can output the ascertained measured values to the higher-level data processing unit. The higher-level data processing unit can, moreover, supply the sensor with energy. The coupling between the data processing unit and sensor can have a galvanically isolated in particular, inductive interface.

The oxidation of Berlin white to Berlin blue is not readily reversible. In order to reduce Berlin blue formed by the interaction with the measuring fluid to Berlin white again and thereby change the sensor into a state in which a new measured value can be ascertained, a DC voltage is applied between the first electrode 11 and the second electrode 12 that is suitable for electrochemically reducing Berlin blue. The voltage required to cathodically reduce Berlin blue to Berlin white depends upon the respective electrode and matrix material. It preferably lies between 0.7 V and −0.7 V more preferably, 0.5 and −0.5 V for oxidation and reduction with respect to a platinum reference electrode. It can be applied for a pre-specified time span t that in the present example is less than 5 minutes preferably, less than 1 minute and, more preferably, less than 30 seconds but at least 0.1 second. In alternative embodiments, it is also possible to apply a voltage between the first and second electrodes 11, 12 that varies as a function of time, e.g., in the form of a short DC voltage pulse, or in the form of one or more sequential voltage ramps in which the voltage is increased linearly from zero to a pre-specified value of the indicated range, and then lowered. A voltage progression adapted to the embodiment of the sensor element 6, i.e., its materials in particular, the indicator material and layer structure can be ascertained in preliminary experiments.

In an alternative embodiment to the indicated exemplary embodiment, the sensor 6 can have a third electrode serving as a reference electrode, in addition to the two electrodes 11 and 12. The reference electrode can, for example, be a platinum wire, or a platinum wire coated with a conductive, barely soluble salt. The voltage source 8 in this embodiment comprises a 3-electrode circuit that is designed to apply a pre-specified voltage as a function of time, in particular, a voltage pulse or a voltage which is constant for a pre-specified time span between one of the electrodes 11 and 12 that serves as a working electrode.

The sensor circuit 1 and/or a higher-level unit connected to the sensor circuit 1 for communication can be connected to the voltage source 8 in order to control it. In the present example, the sensor circuit 1 comprises a function generator that is designed to control the voltage source 8 such that the voltage source 8 applies a pre-specified voltage as a function of time to the electrodes 11, 12. The function can be selected by a sensor user and pre-specified to the sensor circuit 1.

In a very simple embodiment, the function generator can be omitted, in that the sensor circuit for controlling the voltage source actuates only a switch that optionally connects or disconnects the voltage source emitting a constant DC voltage to or from the electrodes. The sensor circuit in this case can close the switch for a pre-specified period, such as 30 seconds, to apply a DC voltage pulse to the electrodes.

In the present example, the sensor circuit 1, after ascertaining each measured value, controls the voltage source 8 such that the voltage source 8 applies a DC voltage pulse of 30 seconds duration to the electrodes 11, 12 so that the membrane 10 is regenerated after each measured value is ascertained, i.e., an oxidized form of the indicator substance present in the membrane 10 is electrochemically reduced.

If large changes in concentration in the measuring fluid are not anticipated, or the rise in concentration of hydrogen peroxide is exclusively process-related, the membrane 10 does not have to be regenerated after each measured value is ascertained; instead, regenerations over larger intervals of time are sufficient in these cases. The frequency of such regeneration from applying a voltage to the electrodes 11, 12 can be pre-specified in an advantageous embodiment of the sensor 100 by a user entry, or by a signal to the sensor circuit 1 from the higher-level data processing unit that may be connected to the sensor circuit 1.

In an alternative embodiment, in addition to a first indicator substance such as Berlin white, the sensor element 6 or the membrane 10 can contain another indicator substance such as an analog of Berlin white or Berlin blue with the structure $A_nM_m[Fe(CN)_6]xH2O$, wherein A is an alkali metal, and M is a transition metal such as cobalt, nickel, magnesium, cadmium, copper, chromium, vanadium, or ruthenium. For measurements with a large cross-sensitivity, a confidence value can be achieved by means of a comparative measurement. In this case, the voltage receiver detects both the intensity of measuring radiation changed by the first indicator substance as well as the intensity of measuring radiation changed by the other indicator substance. Based upon the two measuring signals of the radiation receiver representing the respective intensities, the sensor circuit can ascertain two measured values and compare them with each other. When the deviation between the two measured values is too large, the sensor circuit 1 can output this, for example, in the form of an error or warning message. The two measurements do not have to always occur at the same time; instead, they can be activated by the user, as desired, by input to the sensor circuit 1, or to a higher-level unit connected to the sensor circuit.

In the present exemplary embodiment, the housing 9 is designed as a single part, i.e., the sensor element 6 is not exchangeable. This is advantageous when the sensor element retains its full functionality over a long period, e.g., when the components of the sensor element in particular, the matrix, the indicator substance, and/or the reference dye are not subject to significant aging, which can cause an impairment of sensor functionality. This is, for example, possible when the sensor element is formed from inorganic substances. If the sensor element comprises substances that are subject to aging, such as an organic matrix, an organic indicator substance, or an organic reference dye, the sensor element can be designed to be exchangeable, or the housing can have an exchangeable cap which comprises the sensor element.

Figures 3, 4:
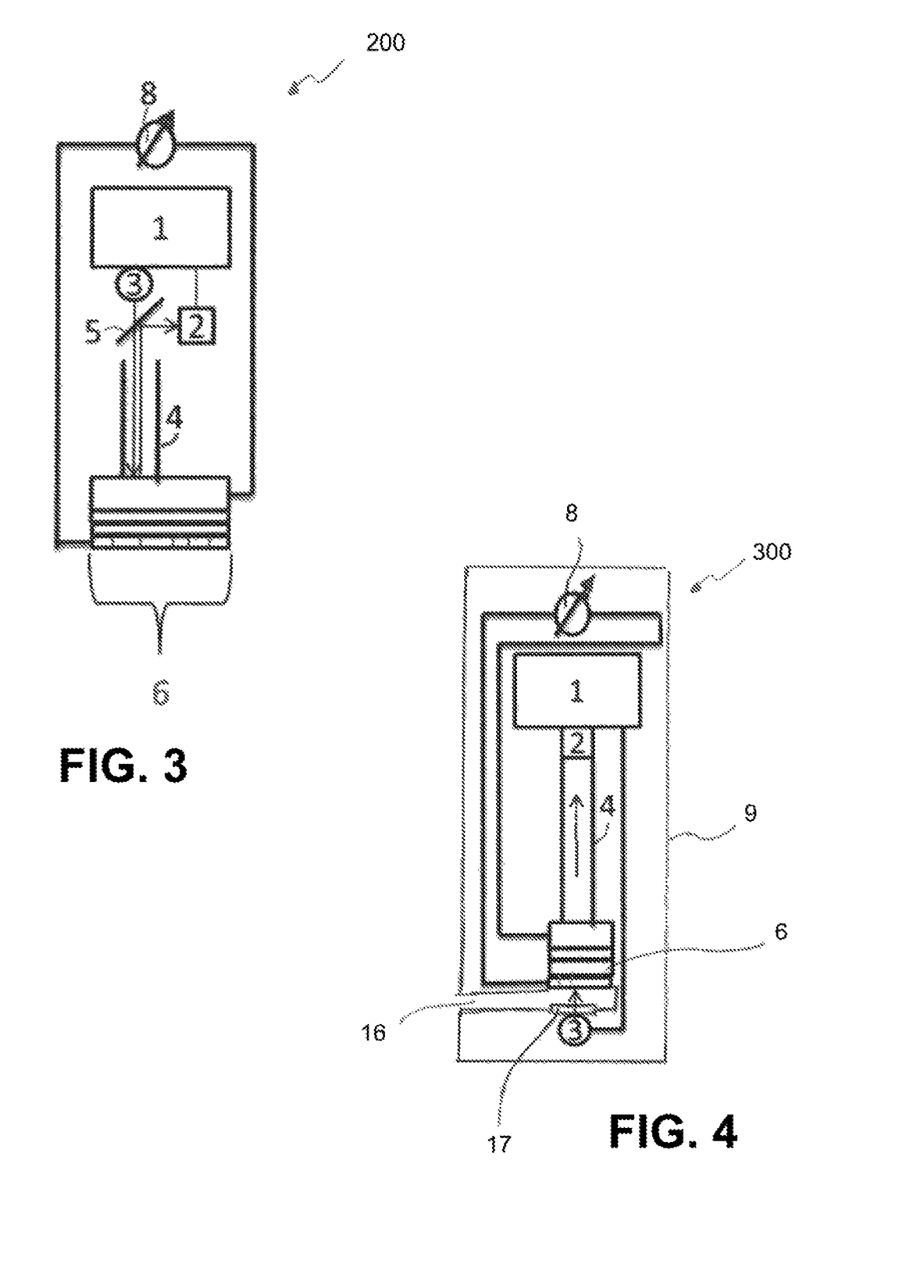
FIG. 3 shows a sensor for measuring a concentration of a reactive oxygen species according to a second exemplary embodiment.
FIG. 4 shows a sensor for measuring a concentration of a reactive oxygen species according to a third exemplary embodiment.

FIG. 3 schematically portrays a second exemplary embodiment of a sensor 200 for determining a concentration of a relative oxygen species. The sensor 200 is substantially analogous in design to the sensor 100 portrayed in FIG. 1 but, however, differs in the manner in which the measuring radiation is conducted to the sensor element, or in which the measuring radiation influenced by the oxidized form of the indicator substance is returned from the sensor element. The same components of the sensors 100 and 200 are designated with the same reference signs in FIGS. 1 and 3. Like the sensor 100 portrayed in FIG. 1, the sensor 200 comprises a sensor circuit 1, a radiation source 3, a radiation receiver 2, and a sensor element 6. These are designed in the same way as the corresponding elements of the sensor 100. In addition, the sensor 200 comprises a semi-transparent mirror 5 through which measuring radiation from the radiation source 3 passes to a light guide 4 and is conducted to the sensor element 6. In the sensor element 6, measuring radiation influenced by the oxidized form of the indicator substance is returned by the light guide 4 to the semi-transparent mirror and is deflected thereby to the radiation detector 2. The measured values are detected and the indicator substance is regenerated in the sensor 200 depicted in FIG. 3 in the same manner as with the sensor 100 depicted in FIG. 1.

FIG. 4 schematically portrays another exemplary embodiment of a sensor 300, in which the ascertainment of the measured value is based upon an absorption measurement. Components of the sensor 300 that are designed to be identical to those of the sensor 100 described with reference to FIG. 1 are identified with the same reference signs as the corresponding components of the sensor 100. Like the sensor 100 of the first exemplary embodiment, the sensor 300 comprises a sensor circuit 1, a radiation source 3, and a radiation receiver 4.

The sensor 300 has a housing 9 that forms a cuvette 16 designed as a recess. If the face end of the housing 9 comprising the cuvette 16 is immersed in a measuring fluid, this enters the cuvette 16. The cuvette 16 has opposing side walls. One of the side walls is closed by a sensor element 6 which contains an indicator substance and, moreover, can be designed like the sensor element 6 portrayed in FIG. 2. As described with reference to the sensor 100 portrayed in FIGS. 1 and 2, the analyte contained in the measuring fluid oxidizes the indicator substance contained in the sensor element into an oxidized form of the indicator substance.

The other side wall of the cuvette 16 comprises a window 17, opposite the sensor element 6, which is formed from a material transparent to the measuring radiation emitted by the radiation source 3. The radiation source 3 is arranged in the face end region of the housing 9 behind the window 17 so that, in the present example, the radiation receiver 2 and radiation source 3 are arranged on different sides of the sensor element 6. The measuring radiation emitted by the radiation source 3 accordingly first passes through the window 17, the cuvette 16, and the sensor element 6. In the sensor 6, the measuring radiation is changed, because part of the measuring radiation is absorbed by the oxidized form of the indicator substance in the present example, by the blue-colored Berlin blue. The changed measuring radiation passes from the sensor element 6 into the light guide 4, which guides the changed measuring radiation to the radiation receiver 2. This is designed to emit an electrical signal, which depends upon the received intensity of the changed measuring radiation, to the sensor circuit 1. On the basis of an empirically determined assignment guideline that assigns values of the measurand to the measuring signals of the radiation receiver 2, the sensor circuit ascertains a measured value of the concentration of the analyte in the measuring fluid.

Like the sensor 100 in the first exemplary embodiment, the sensor 300 comprises a voltage source 8 which can be controlled by the sensor circuit 1 or a higher-level unit connected to the sensor circuit 1 and which is connected by electrical lines 13, 14 to electrodes of the sensor element 6. As described with reference to the first exemplary embodiment, the voltage source 8 and the electrodes serve to regenerate the indicator substance by electrochemically reducing the oxidative form of the indicator substance.

Figure 5:
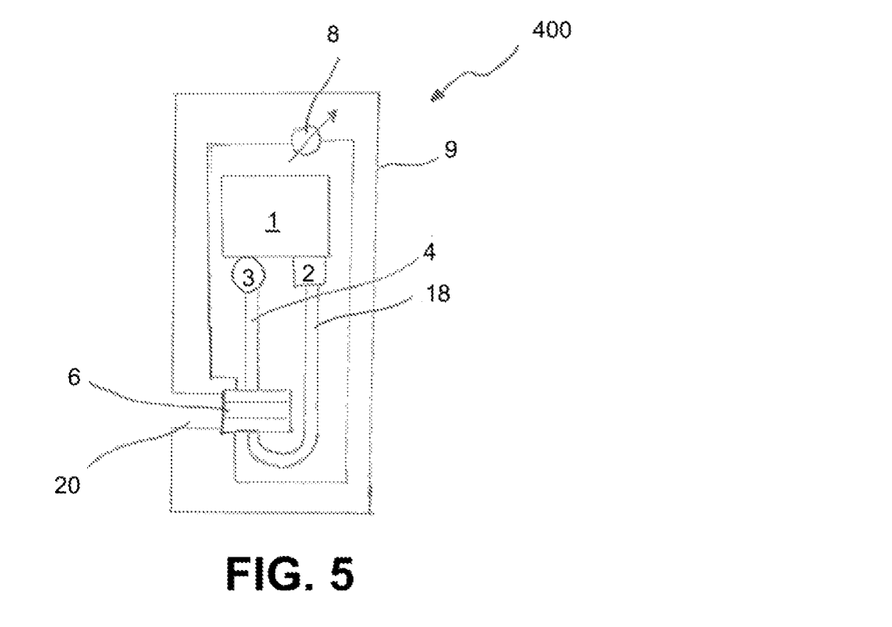
FIG. 5 shows a sensor for measuring a concentration of a reactive oxygen species according to a fourth exemplary embodiment.

FIG. 5 schematically portrays another exemplary embodiment of a sensor 400, in which the ascertainment of the measured value is based upon an absorption measurement. Components of the sensor 400 that are designed to be identical to those of the sensor 100 described with reference to FIG. 1 are identified with the same reference signs as the corresponding components of the sensor 100. The sensor 400 comprises a sensor circuit 1, a radiation source 3 that is designed to emit measuring radiation, as well as a radiation receiver 2. Moreover, the sensor 400 comprises a sensor element 6 which comprises an indicator substance and can be designed like the sensor element 6 portrayed in FIG. 2. The sensor element 6 comprises, in particular, two electrodes that are contacted by electrical lines 13, 14 and are connected to a voltage source 8. As described in detail above with reference to the first exemplary embodiment, the voltage source 8 can be controlled by the sensor circuit 1 or a higher-level unit connected to the sensor circuit 1, in order to carry out regeneration of the indicator substance.

The housing 9 in the present exemplary embodiment has a side opening 20 through which the sensor element 6 can be supplied from the side with a measuring liquid containing the analyte. In contrast to the sensor 300 described above with reference to FIG. 4, the radiation source 3 and radiation receiver 2 are not arranged on different sides of the sensor element 6. Instead, the sensor 400 shown here comprises a first light guide 4 that serves to guide the measuring radiation emitted by the radiation source 3 to the sensor element 6, as well as a second light guide 18 which, after the measuring radiation passes through the sensor element 6 and is influenced by being absorbed by the indicator substance, guides it to the radiation receiver 2. Accordingly, the radiation receiver 2 in the exemplary embodiment depicted here can be arranged in the proximity of the radiation source 3, in particular, on the same side of the sensor element 6 as the radiation source 3.

Figure 6:
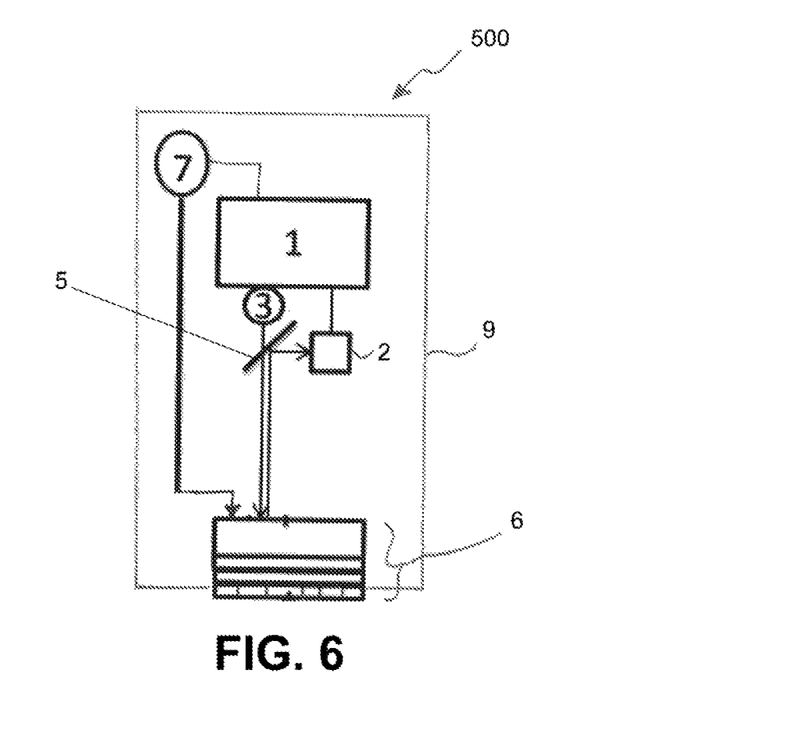
FIG. 6 shows a sensor for measuring a concentration of a reactive oxygen species according to a fifth exemplary embodiment.

FIG. 6 schematically portrays another exemplary embodiment of a sensor 500 in which the sensor is regenerated by the generation of a current which is generated by an outside pulse acting on the sensor element. Like the sensor 100 of the first exemplary embodiment, the sensor 500 comprises a housing 9 with a sensor circuit 1 arranged therein, a radiation source 3, a radiation receiver 2, and a sensor element 6. Measuring radiation from the radiation source 3 is guided through a semi-transparent mirror 5 to the sensor element 6; measuring radiation reflected back by the sensor element 6 and influenced by the oxidized form of an indicator substance contained in the sensor element 6 is directed to the radiation receiver 2 by the semi-transparent mirror 5. The radiation source 3 can comprise a light diode or another light source for emitting measuring radiation at a wavelength or a wavelength range, and the radiation receiver 2 can have one or more photodiodes or a CCD element. The radiation receiver 2 can also be designed as a miniature spectrometer that is designed to detect a spectrum of the measuring radiation influenced by interacting with the indicator substance contained in the sensor element 6.

Figure 7:
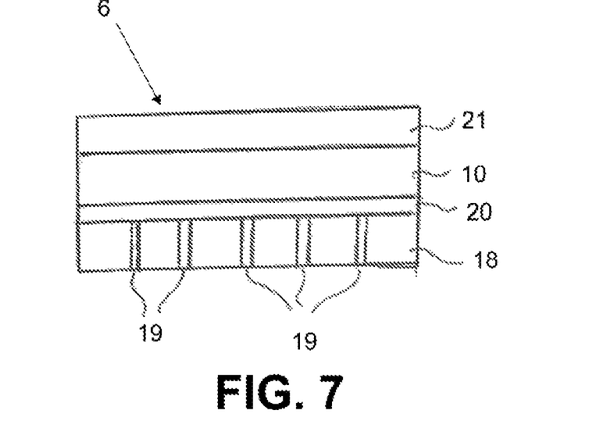
FIG. 7 shows a sensor element of the sensor portrayed in FIG. 6.

The sensor element 6 is shown in detail in FIG. 7. In the present example, the sensor element 6 comprises a plurality of layers. A first layer is the membrane 10, which is formed from a matrix with an indicator substance embedded therein. In addition to the indicator substance, the matrix contains a reference substance that can be excited to luminescence by the measuring radiation. On its side facing away from the inside of the housing 9, the sensor element 6 has a protective coating 18 that is permeable to the measuring fluid or at least the analyte. For example, the protective coating 18 can have pores 19. An opaque layer 20 is arranged between the protective coating 18 and the membrane 10 and prevents radiation from the outside from penetrating into the inside of the housing, which, however, is permeable at least to the analyte. On the side facing the housing, the membrane 10 has a piezoelectric layer 21, whose function will be explained below.

In the present exemplary embodiment, the membrane contains an indicator substance that can be oxidized by ROS, and a reference substance that can be excited to luminescence by the measuring radiation. As noted above, the use of such a reference substance together with the indicator substance makes it possible to determine the analyte concentration for example, by means of phase angle measurement. Alternatively, the intensity of the luminescence radiation emitted by the oxidized indicator substance, or a decay time of the luminescence intensity (in these instances, also without the reference substance), can, in order to ascertain the analyte concentration, also be ascertained.

In the exemplary embodiment depicted here, the indicator substance is regenerated by an external stimulus that causes a flow of current through the sensor element 6 or the membrane 10, and accordingly causes an electrochemical reduction of the oxidized form of the indicator substance (in this case, Berlin blue). In the present example, the piezoelectric layer 21 serves this purpose. This piezoelectric layer 21 comprises a plurality of nanorods formed from zinc oxide. These nanorods are designed to convert pressure into electrical energy. The layer 21 can be produced by spraying zinc oxide onto the surface of the membrane 10, followed by heating to approximately 90° C. During the heat treatment at 90° C., the nanorods grow and form a layer adhering to the membrane.

In addition, the sensor 500 comprises a pressure source 7, e.g., in the form of a sound source. The pressure source 7 can, alternatively, also be designed to emit a pneumatically generated pressure. In an alternative embodiment of the sensor element, piezoelectric nanorods can be directly embedded in the membrane 10. To regenerate the indicator substance, the sensor circuit 1, or a higher-level unit connected to the sensor circuit 1, can be designed to control the pressure source 7 to generate a pressure pulse which causes a flow of current in the sensor elements 6 through the membrane 10 at a level which electrochemically reduces the oxidized form of the indicator substance contained in the membrane.

Although determining the measured value by measuring a phase angle shift between radiated luminescence of the indicator substance and radiated luminescence of a reference substance is described in this exemplary embodiment in combination with the regeneration of the indicator substance by a pressure pulse using a piezoelectric transducer, this way of determining the measured value can also, of course, be used in combination with all of the other methods and devices described here for regenerating the indicator substance in particular, in combination with regeneration by electrodes that are in contact with the membrane containing the indicator substance and to which a voltage can be applied as a function of time, as described in the examples according to FIGS. 1 through 5.

Figure 8:
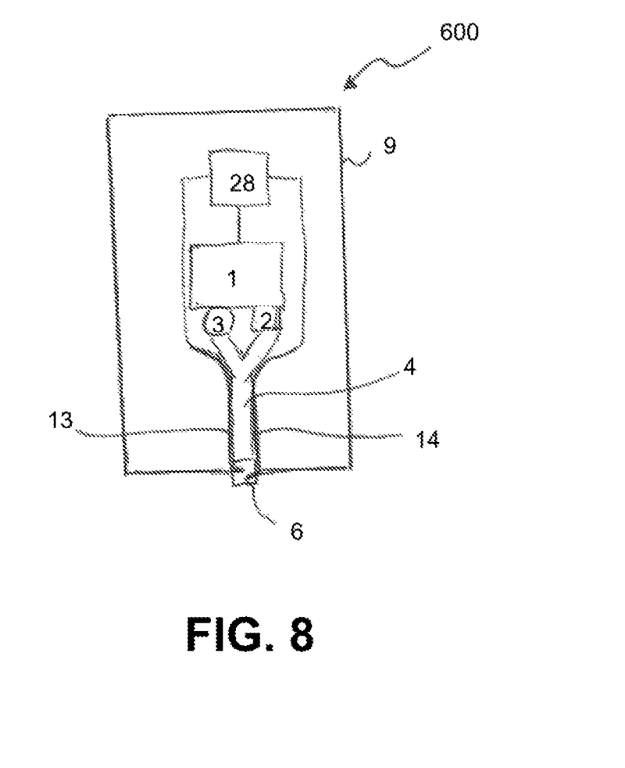
FIG. 8 shows a sensor for measuring a concentration of ROS according to a seventh exemplary embodiment that is designed to perform a self-calibration.

FIG. 8 schematically portrays a sensor 600 that can execute a self-test in particular, a self-verification or self-calibration. The sensor 600 comprises a sensor housing 9, a sensor circuit 1, a voltage source 28 controllable by the sensor circuit 1, a radiation source 3 that is controllable by the sensor circuit 1 and which is designed to emit measuring radiation, and a radiation receiver 2. Moreover, the sensor 600 comprises a sensor element 6 that comprises an indicator substance which is oxidized by a ROS analyte such as hydrogen peroxide into an oxidized form, wherein the oxidized form of the indicator substance has a characteristic absorption and/or a characteristic luminescence behavior that can be detected by the radiation source 3 and the radiation receiver. The indicator substance can, for example, be Berlin white, which is oxidized by hydrogen peroxide into Berlin blue.

The sensor 600 comprises a Y-shaped light guide 4 that connects the radiation source 3 and radiation receiver 2 to the sensor element 6 so that radiation emitted by the radiation source is guided via the light guide 4 to the sensor element 6, and measuring radiation influenced by the indicator substance of the sensor element 6 is guided via the light guide 4 to the radiation receiver. In the present example, the sensor element 6 is applied as a layer structure directly onto the exit surface of the light guide 4.

Figure 9:
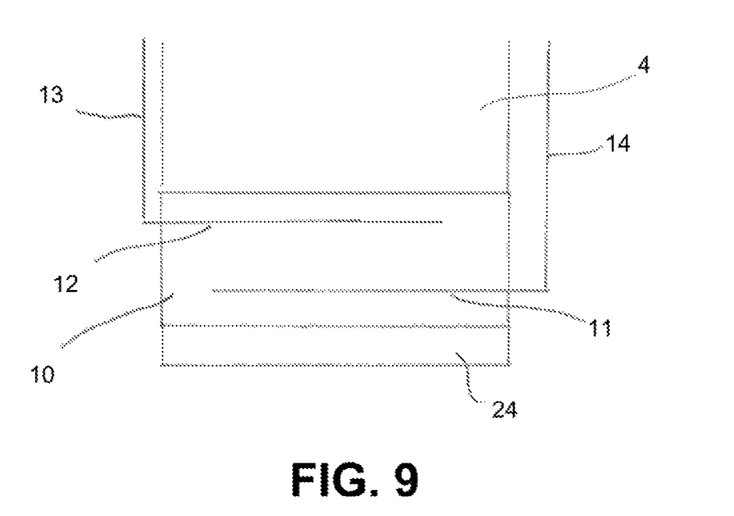
FIG. 9 shows the sensor element of the sensor portrayed in FIG. 8.

The sensor element 6 is portrayed in detail in FIG. 9. It has a membrane 10 that is formed from an inorganic matrix, which, for example, can consist of a salt, such as potassium chloride or lithium oxide, that is transparent to the measuring radiation and the influenced measuring radiation, and the indicator substance contained in the matrix in this case, Berlin white.

On its side designated for contacting the measuring fluid, the membrane is covered with a protective layer 24. The protective layer 24 in the present example is selective for a specific ROS analyte in this case, hydrogen peroxide.

Two electrodes 11, 12, are embedded in the membrane 10 and can be connected by electrical lines 13, 14 to the voltage source 28. In the present example, the electrodes 11, 12 consist of metal; however, they can also consist of a material transparent to the measuring radiation and the influenced measuring radiation, as in the above-described example. In the example described here, the electrodes are designed as metal structures embedded in the matrix, such as metal wires or flat metal structures that have one or more openings through which the measuring radiation in the membrane 10 can penetrate. The lines 13, 14 can be carried along with the light guide 4, e.g., wound around it or applied thereto as a coating.

To regenerate the indicator substance, the sensor 600 can be designed fully analogously to the method described in conjunction with the first exemplary embodiment. In addition, the sensor 600 can perform a self-verification and/or self-calibration.

For this, the sensor circuit 1 can control the voltage source 28 in such a way that, after a regeneration of the indicator substance, a pre-specified voltage between the electrodes 11, 12 is applied that causes a targeted oxidation of the indicator substance into its oxidized form. The voltage level is such that it simulates a particular analyte concentration in this case, thus a particular $H_2O_2$ concentration. The color change of the indicator substance is detected by the sensor circuit 1 by a measurement of absorption or fluorescence using the radiation source 3 and the voltage receiver 2. The measured value of the analyte concentration ascertained using the associated measuring signal of the radiation receiver can be compared by the sensor circuit 1 with the simulated concentration to verify or calibrate the sensor 600. Based upon this comparison, a drift correction can, optionally, be performed.

In an alternative embodiment of the present exemplary embodiment described with reference to FIGS. 8 and 9, the sensor can also comprise a third electrode, which serves as a reference electrode. The reference electrode can, for example, be designed as a platinum wire, or as a platinum wire with a coating comprising a barely soluble, electrically-conductive salt. The reference electrode is also in contact with the membrane 10; it can, for example, be embedded therein. In this case, the voltage source can comprise a 3-electrode circuit that is designed to apply a pre-specified voltage between the reference electrode and an electrode of the two electrodes 11 and 12 serving as a working electrode.

Figure 10:
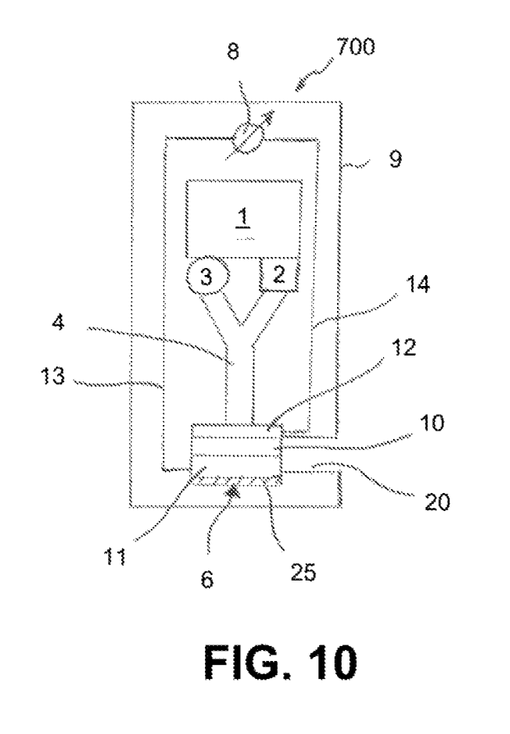
FIG. 10 shows a sensor for measuring a concentration of a ROS according to an eighth exemplary embodiment.

FIG. 10 schematically portrays another exemplary embodiment of a sensor 700 that is designed to determine an analyte concentration based upon a measurement of reflection. The sensor 700 comprises a housing 9 in which a sensor circuit 1, a radiation source 3, a radiation receiver 2, a sensor element 6, and a light guide 4 to conduct the radiation from the radiation source 3 to the sensor element 6, and to guide radiation from the sensor element 6 back to the radiation receiver 2. The sensor element 6 has a membrane 10 which comprises a matrix and an indicator substance immobilized in the matrix, e.g., Berlin blue as the indicator substance of $H_2O_2$ as the analyte. On its side facing the radiation source 3, the membrane 10 is covered with a first electrode 12 that is transparent to the measuring radiation and through which the measuring radiation can pass into the membrane 10. On its side opposing the membrane, the membrane 10 is covered with a second electrode 11, which is also transparent to the measuring radiation. Both electrodes 11, 12 can be designed as indium tin oxide layers. Another layer 25 is arranged on the second electrode 11 and is designed to reflect the measuring radiation from the radiation source 3 transmitted by the membrane 10 and electrodes 11, 12. The additional layer 25 can, for example, be a metal mirror. The measuring radiation reflected by the additional layer 25 is radiated back to the light guide 4 through the other layers of the sensor element 6, and is conducted from these to the radiation receiver 2.

The membrane 10 can be supplied with a measuring fluid through a side opening 20 in the housing 9. As described above, the indicator substance is oxidized by an analyte contained in the measuring fluid in this case, hydrogen peroxide into a colored, oxidized form in this case, Berlin blue. In order to ascertain values of the measurand, the radiation intensity received by the radiation receiver 2 can therefore be evaluated by the sensor circuit 1 using the measuring signals from the radiation receiver, in a manner fully analogous to that described above with reference to the absorption measurement.

Figure 11:
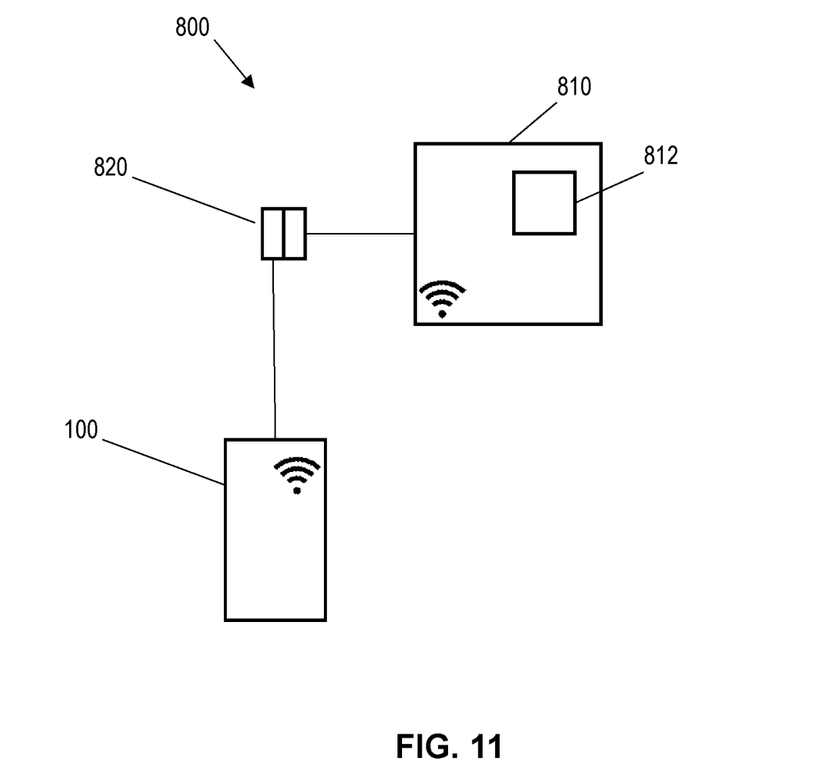
FIG. 11 shows a measuring device including an embodiment of a sensor of the present disclosure connected with a higher-level data processing unit.

FIG. 11 schematically portrays illustrates a measuring device 800. The measuring device 800 includes a sensor according to any of the embodiments of the present disclosure, for example, the sensor 100, and a higher-level unit 810 connected to the sensor 100. The higher-level unit 810 may be a measuring transducer, control electronics or an energy supply. As shown in FIG. 11, the sensor 100 and the higher-level unit 810 may be coupled to each other by a galvanically isolated connection 820 such as an inductive plug-in connector coupling and/or a radio connection. In an embodiment in which the sensor 100 is coupled to the higher-level unit 810 by the galvanically isolated connection 820, energy may be transmitted unidirectionally from the higher-level unit 810 to the sensor 100 via the galvanically isolated connection 820. In certain embodiments, the higher-level unit 810 can comprise a data processing unit 812. In further embodiments, the measuring device 800 may be configured such that additional data, for example, the measurand, are transmitted bi-directionally between the sensor 100 and the higher-level data processing unit 812 via the galvanically isolated connection 820.

A series of examples of the production of a sensor element or a membrane for a sensor for measuring a concentration of one or more reactive oxygen species will be presented in the following.

In general, the individual components can be applied in layers according to the present application. This is, however, not absolutely necessary; instead, a plurality of membrane structures is conceivable. For example, layer structures, matrix structures, or interpenetrating polymer networks consisting of two or more purely inorganic or purely organic materials, or of a combination of organic and inorganic materials, can be applied to a transparent substrate, or directly to a face (exit surface) of a light guide. All of the methods known to a person skilled in the art, such as dip coating, spray coating, squeegeeing, spin coating, CVD (chemical vapor deposition), PVD (physical vapor deposition), lamination, printing, electrospinning, and electrodeposition, are conceivable in this context.

Example 1

Alternatingly, polyallylamine and indicator such as cobalt tetraaminophthalocyanine and polyacrylic acid are applied in several layers by squeegeeing as a stack of layers to a substrate:

The sequence of layers can appear as follows:
1) Polyallylamine hydrochloride+indicator
2) Polyacrylic acid
3) Polyallylamine hydrochloride+indicator
4) Polyacrylic acid After applying the layers, electric voltage is applied for the electrodeposition of the dye polymer polycobalt tetraaminophthalocyanine. The indicator substance is yellowish-brown in nature in its oxidized form, and pink in a reduced state. Alternatively, Berlin white/Berlin blue can also be used as the indicator substance, without electrodeposition.

Example 2

The membrane can also be a matrix consisting of polyacrylic acid or Nafion with microspheres embedded therein consisting of polyallylamine in which the indicator substance, such as Berlin White, is encapsulated. Polyacrylic acid or Nafion are highly suitable as an organic matrix because they absorb water, and therefore also an aqueous measuring liquid, well, and accordingly ensure a short sensor response time.

Example 3

A mixture consisting of tetraethylorthosiloxane with Berlin white is dispersed in a glycerin/1M potassium chloride/ acetic acid solution, and the mixture is applied to a quartz glass slide (8 mm in diameter) serving as the substrate and hardened for 2 days.

Example 4

500 mg Nafion and 5 mg Berlin white are dispersed in a solution consisting of ethanol/water (1:1) and dripped onto a Teflon film 5 µm thick.

Example 5

A solution consisting of Berlin white, poly(2-acrylamido-2-methyl-1-propane sulfonic acid)/polyaniline/tungsten oxide is applied to an indium tin oxide substrate and adhered to another porous indium tin oxide substrate. The indium tin oxide substrates serve as electrodes for applying a voltage via the membrane formed from poly(2-acrylamido-2-methyl-1-propane sulfonic acid)/polyaniline/tungsten oxide/Berlin white. Tungsten oxide serves to convert light into electrical energy, so that a reduction of Berlin blue into Berlin white can be triggered by a light pulse.

Example 6

A solution consisting of Berlin blue and a histamine-containing polymer is applied to an indium tin oxide substrate and adhered to another porous indium tin oxide substrate.

Example 7

A solution consisting of Berlin blue, graphite, and Nafion is applied to an indium tin oxide substrate and adhered to another porous indium tin oxide substrate.

Example 8

A primer such as siloxane is applied to an indium tin oxide substrate, and, after a short waiting period of about 30 minutes, a solution consisting of Berlin blue, Nafion (dissolved in water 1:1), and, after a still shorter waiting period, again Berlin blue is dripped into an aqueous 1M KCl solution. Then, a porous indium tin oxide substrate is adhered to the edges with an acrylate adhesive and provided in the center with a primer. The substrate treated in this manner is adhered to the coated indium tin oxide substrate. Alternatively, an indium tin oxide substrate with holes or media-side porous structures can be filled with Berlin blue and Nafion. In this case, the adhesion and application of a primer can be omitted when the pore size is less than 200 µm.

Example 9

Prussian blue is sputtered onto a microporous indium tin oxide substrate.

Example 10

The sensor arrangement in this example is suitable for calibrating, adjusting, or verifying the sensor by simulating an analyte concentration (cf. exemplary embodiment according to FIGS. 8 and 9). This enables calibration, adjustment, or verification in the process, without the sensor having to be removed from the process system.

For this, a 3-electrode arrangement is used in the membrane with a layer sequence of ITO+monolithic layer of Berlin blue/KCl-Pt/ITO. The ITO electrode arranged nearer on the inside of the housing can serve as a working electrode, and the other electrode permeable to the measuring fluid or at least the analyte can be inserted as a counter electrode, whereas the Pt—KCl layer serves as a reference electrode. As an alternative to potassium chloride, ion-conducting or electron-conducting, barely or non-water-soluble substances such as Al—Li alloys, graphite, Li-cobalt oxide, or Li-vanadium oxide can be used. Individual concentrations of a certain analyte can be simulated by the selective application of an oxidative positive, or reducing negative, voltage between the reference electrode and the working electrode. For example, an optical measured value check can be performed by the sensor itself, which renders an external calibration of the sensor superfluous. Accordingly, a zero-point calibration of $H_2O_2$ can be carried out by applying a voltage of 0.7 V to −0.7 V, or, more preferably, 0.5 V to −0.5 V, with respect to the KCl—Pt reference electrode. The simulation value can, based upon values derived from experience, also serve for adjustment.

Example 11

In this example, the sensor element can be designed as described with reference to example 10, wherein glucose oxidase is also introduced into the Nafion matrix. In the presence of glucose in the measuring fluid, by reacting with the glucose oxidase contained in the matrix, hydrogen peroxide is formed that causes oxidation of the Berlin white contained in the matrix to Berlin blue. A concentration of $H_2O_2$ in the Nafion matrix can be ascertained by a measurement of absorption or luminescence as described above, which in turn is a measure of the glucose concentration in the measuring fluid. The sensor circuit can correspondingly be designed to ascertain a measured value of the glucose concentration in the measuring fluid from a measuring signal of the radiation receiver according to a, for example, empirically ascertained assignment guideline.

The invention claimed is:

1. A sensor for determining a measurand correlated with a concentration of at least one analyte in a measuring fluid, comprising:
   a housing;
   a sensor element disposed in the housing and extending at least to an exterior surface of the housing as to contact the measuring fluid, the sensor element including a membrane that contains an indicator substance, wherein the indicator substance is oxidized into an oxidized form of the indicator substance by the at least one analyte in the measuring fluid, wherein the at least one analyte is one of a class of reactive oxygen species;
   at least two electrodes in electrical contact with the sensor element;
   a voltage source disposed in the housing, connected to the at least two electrodes and adapted to generate a current flow in the sensor element sufficient to cause a reduction of the oxidized form of the indicator substance and thereby a regeneration of the indicator substance;
   an optical measuring sensor disposed in the housing and configured to generate excitation radiation directed toward the sensor element and to detect measuring radiation from the sensor element, the measuring radiation effected by the oxidized form of the indicator substance under influence of the excitation radiation, the optical measuring sensor further configured to generate an electrical measuring signal based on the measuring radiation detected by the optical measuring sensor; and a sensor circuit disposed in the housing, connected to the optical measuring sensor and configured to receive the measuring signal and to process the measuring signal to ascertain a measured value of the measurand using the measuring signal.

2. The sensor of claim 1, wherein, to generate the measuring signal, the optical measuring sensor is configured to detect an intensity and/or a phase angle shift, and/or a decay time, and/or a wavelength shift of the detected measuring radiation.

3. The sensor of claim 1, wherein the at least one analyte is hydrogen peroxide.

4. The sensor of claim 1, wherein the indicator substance includes an organic or inorganic electrochromic substance.

5. The sensor of claim 4, wherein the indicator substance has the composition $K_n M1_m [M2_o(CN)_6]_p$, wherein:
- K is selected from a group consisting of Li, Na, K, Rb, Cs, and $NH_4$;
- M1 and M2 are selected from a group of metals consisting of Fe, Co, Ni, Mn, Cd, Cu, Cr, V, and Ru; and
- M1 and M2 are metals that are the same or different from each other.

6. The sensor of claim 1, wherein the indicator substance is thermally stable up to at least a temperature of 140° C.

7. The sensor of claim 1, wherein the voltage source includes at least one converter element in contact with the indicator substance, the at least one converter element configured to convert mechanical, optical, or thermal energy into a voltage or current.

8. The sensor of claim 1, wherein the voltage source includes a plurality of piezo crystals in contact with the indicator substance and embedded in the sensor element.

9. The sensor of claim 1, wherein the voltage source includes a Peltier element in contact with the indicator substance.

10. The sensor of claim 1, wherein the voltage source includes an electrochromic substance that converts an external light pulse into current.

11. The sensor of claim 1, wherein the at least two electrodes contact the indicator substance of the sensor element, wherein the voltage source is connected to the at least two electrodes in an electrically conductive manner and configured to apply a voltage between the electrodes.

12. The sensor of claim 11, the sensor further comprising a voltage controller connected to the voltage source and configured to cause a pre-specified voltage between the at least two electrodes as a function of time.

13. The sensor of claim 11, wherein the at least two electrodes include at least one metal, a semiconductor material, or a conductive polymer.

14. The sensor of claim 13, wherein the at least one metal includes copper, silver, platinum, gold, or carbon, and the semiconductor material includes indium tin oxide (ITO) or $LiWoO_3$.

15. The sensor of claim 11, wherein a first electrode of the at least two electrodes covers at least part of a first side of the membrane, and a second electrode covers at least part of a second side of the membrane.

16. The sensor of claim 15, wherein the first electrode is transparent to the measuring radiation and the influenced measuring radiation and is impermeable to the at least one analyte and/or the measuring fluid.

17. The sensor of claim 15, wherein the second electrode has a network structure that is permeable to at least the at least one analyte and/or the measuring fluid.

18. The sensor of claim 11, wherein the sensor element includes a sensor face defining at least a portion of an exterior of the sensor, and wherein a geometry of a second electrode of the at least two electrodes determines a shape and/or properties of the sensor face such that the shape of the sensor face inhibits the accumulation of gas bubbles or impurities.

19. The sensor of claim 11, wherein the sensor circuit is configured to ascertain a current strength of a current flowing between a first electrode and a second electrode of the at least two electrodes at a pre-specified voltage and, using the ascertained current strength, to determine the measurand, or another measurand different from the measurand.

20. The sensor of claim 19, wherein the sensor circuit is configured to simulate a value of the measurand by applying a pre-specified voltage over a pre-specified period, via a three-electrode circuit, to the membrane and to ascertain a measured value of the simulated measurand using the optical measuring sensor, the sensor circuit further configured to perform a calibration, verification, or adjustment of the sensor using the ascertained measured value.

21. A measuring device, comprising:
a housing;
a sensor configured to determine a measurand that correlates with a concentration of at least one analyte that belongs to a class of reactive oxygen species in a measuring fluid, the sensor comprising:
  a sensor element disposed in the housing and extending at least to an exterior surface of the housing as to contact the measuring fluid that includes, the sensor element including a membrane that contains an indicator substance, wherein the indicator substance is oxidized into an oxidized form of the indicator substance by the at least one analyte in the measuring fluid;
  at least two electrodes in electrical contact with the sensor element;
  a voltage source disposed in the housing, connected to the at least two electrodes and adapted to generate a current flow in the sensor element sufficient to cause a reduction of the oxidized form of the indicator substance and thereby a regeneration of the indicator substance;
  an optical measuring sensor disposed in the housing and configured to generate excitation radiation directed toward the sensor element and to detect measuring radiation from the sensor element, the measuring radiation effected by the oxidized form of the indicator substance under influence of the excitation radiation, the optical measuring sensor further configured to generate an electrical measuring signal based on the measuring radiation detected by the optical measuring sensor; and
  a sensor circuit disposed in the housing, connected to the optical measuring sensor and configured to receive the measuring signal and to process the measuring signal to ascertain a measured value of the measurand using the measuring signal; and
a higher-level data processing unit connected to the sensor via a galvanically isolated connection and configured to transmit power unidirectionally to the sensor via the galvanically isolated connection.

22. The measuring device of claim 21, wherein the higher-level data processing unit further includes control electronics configured to control and coordinate the sensor circuit, the voltage source and the optical measuring sensor, including for regeneration of the indicator substance.

23. The measuring device of claim 21, wherein the galvanically isolated connection is an inductive plug-in connector coupling and/or a radio connection.

24. The measuring device of claim 21, wherein the higher-level data processing unit is further configured to transmit additional data, including the measurand, bi-directionally between the sensor and the data-processing unit via the galvanically isolated connection.

\* \* \* \* \*